United States Patent
Lei et al.

(10) Patent No.: US 7,490,194 B2
(45) Date of Patent: Feb. 10, 2009

(54) SYSTEM AND METHOD FOR UPDATING FIRMWARE IN A NON-VOLATILE MEMORY WITHOUT USING A PROCESSOR

(75) Inventors: Yung-Chun Lei, Hsin-Chu (TW); Chun-Nan Lin, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 11/772,237

(22) Filed: Jul. 1, 2007

(65) Prior Publication Data

US 2008/0016268 A1    Jan. 17, 2008

Related U.S. Application Data

(63) Continuation of application No. 11/308,243, filed on Mar. 14, 2006, now Pat. No. 7,251,706, which is a continuation of application No. 10/605,030, filed on Sep. 3, 2003, now Pat. No. 7,043,597.

(30) Foreign Application Priority Data

Sep. 5, 2002   (TW) .............................. 91120385 A

(51) Int. Cl.
    *G06F 12/00*    (2006.01)
(52) U.S. Cl. ...................... 711/103; 711/115; 711/154; 711/163; 711/170; 713/1; 713/100
(58) Field of Classification Search ................. 711/103, 711/115, 154, 163, 170; 713/1, 100
    See application file for complete search history.

(56) References Cited

U.S. PATENT DOCUMENTS

| | | | |
|---|---|---|---|
| 5,502,765 A | 3/1996 | Ishiguro et al. | |
| 5,603,056 A | 2/1997 | Totani | |
| 5,819,108 A | 10/1998 | Hsu et al. | |
| 5,901,330 A | 5/1999 | Sun et al. | |
| 6,009,497 A | 12/1999 | Wells et al. | |
| 6,038,640 A | 3/2000 | Terme | |
| 6,170,043 B1 | 1/2001 | Hu | |
| 6,253,281 B1 | 6/2001 | Hall | |
| 6,513,159 B1 * | 1/2003 | Dodson | 717/178 |
| 6,523,083 B1 | 2/2003 | Lin et al. | |
| 6,745,325 B1 | 6/2004 | Gavlik | |
| 6,944,854 B2 * | 9/2005 | Kehne et al. | 717/168 |
| 2003/0229752 A1 | 12/2003 | Venkiteswaran | |

FOREIGN PATENT DOCUMENTS

TW    460786    10/2001

* cited by examiner

*Primary Examiner*—Stephen C Elmore
(74) *Attorney, Agent, or Firm*—Winston Hsu

(57) ABSTRACT

A processing system coupled to an apparatus is provided. The processing system includes: a non-volatile memory (NVM) storing firmware needed by the processing system; and an NVM control interface writing and reading data stored in the NVM. The apparatus verifies a previous piece of data being already written into the NVM, and the NVM control interface writes a current piece of data into the NVM.

17 Claims, 9 Drawing Sheets

SYSTEM AND METHOD FOR UPDATING FIRMWARE IN A NON-VOLATILE MEMORY WITHOUT USING A PROCESSOR

CROSS REFERENCE TO RELATED APPLICATIONS

This is a continuation of U.S. patent application Ser. No. 11/308,243 (now issued as U.S. Pat. No. 7,251,706), which was filed on Mar. 14, 2006 and is included herein by reference, and claims the benefits of U.S. patent application Ser. No. 11/308,243 (now issued as U.S. Pat. No. 7,251,706) and U.S. patent application Ser. No. 10/605,030, filed on Sep. 3, 2003 now issued as U.S. patent No. 7,043,597 and included herein by reference.

BACKGROUND

The present invention relates to a processing system, and more particularly to a processing system capable of directly updating firmware stored in a non-volatile memory according to a protocol between a serial port and the non-volatile memory without utilizing a processor.

Because data stored in a non-volatile memory will not be lost after its electric power is cut off, the non-volatile memory is a very important component in a computer system for storing system data, i.e. firmware. Firmware of a processing system, thus, is usually stored in a non-volatile memory so that the processing system can operate regularly after it is turned on.

Please refer to FIG. 1 that is a functional block diagram of a processing system 10 connected to a computer 20 according to the prior art. The processing system 10 comprises a non-volatile memory (NVM) 12 and a NVM control interface 14. The NVM control interface 14 comprises a plurality of registers for updating and accessing data stored in the NVM 12. The processing system 10 further comprising a processor 16 and a serial port interface 18 electrically connected to a computer 20 via a serial port 22. The processor 16 is used to control operations of the processing system 10 and is electrically connected to the NVM control interface 14 to use the NVM control interface 14 to update the data stored in the NVM 12. The processor 16 is also electrically connected to the serial port interface 18 to use the serial port interface 18 to exchange data with the computer 20 by processing data conversion between serial data bits and data bytes.

During the update of the firmware, the processor 16 must be used to process the update data, i.e. the data used to update the firmware. Moreover, before the processor 16 updates the firmware stored in the NVM 12, some program code stored in the NVM 12, which is necessary for the processor 16, must be stored in another memory, such as a built-in static random access memory (SRAM), or a part of the NVM 12 must be isolated to store the program code.

However, using the SRAM to store the program codes increases the cost of the processing system, and isolating the part of the NVM to store the program codes makes the update of the entire NVM 12 impossible. Furthermore, when the processor 16 is used to update the firmware, a cyclic redundancy check (CRC) method is used to check the data to ensure the correction of updated firmware. However, the correction of updated firmware cannot be guaranteed using the CRC method and it is time-consuming to process a high-accuracy CRC.

SUMMARY OF THE INVENTION

It is therefore one of objectives of the claimed invention to provide a processing system for updating firmware stored in a non-volatile memory without utilizing a processor and related method thereof, to solve the above-mentioned problems.

According to an exemplary embodiment of the present invention, a processing system coupled to an apparatus is provided. The processing system includes: a non-volatile memory (NVM) storing firmware needed by the processing system; and an NVM control interface writing and reading data stored in the NVM. The apparatus verifies a previous piece of data being already written into the NVM, and the NVM control interface writes a current piece of data into the NVM.

According to another exemplary embodiment of the present invention, a processing system electrically connected to an apparatus is provided. The processing system comprises: a processor; a non-volatile memory (NVM) storing firmware required for the processor for operation of the processing system; a serial port interface receiving and transmitting data to the apparatus; and an NVM control interface coupled between the serial port interface and the NVM, writing and reading data in the NVM. The NVM control interface reads a previous piece of data in data bytes format from the NVM, converts the data bytes into serial data bits for the apparatus to verify the previous piece of data, and writes a current piece of data into the NVM.

According to yet another exemplary embodiment of the present invention, a method for a first apparatus having a non-volatile memory (NVM) to receive firmware from a second apparatus is provided. The method includes: sending data corresponding to the firmware from the second apparatus to the NVM; verifying a previous piece of data being already written into the NVM; and writing a current piece of data into the NVM.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
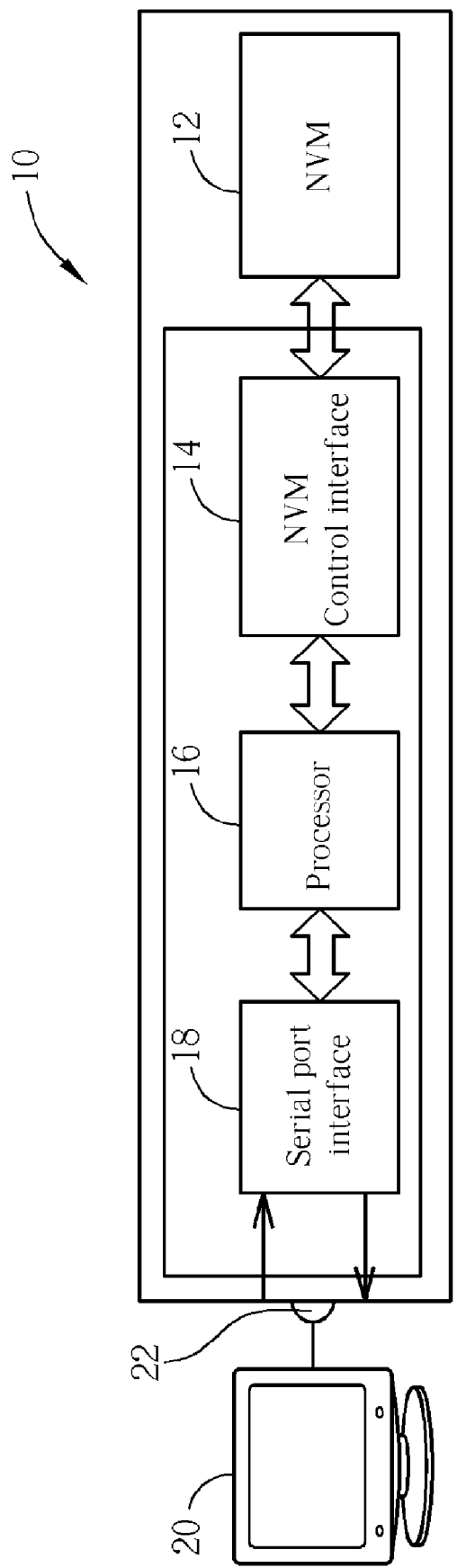
FIG. 1 is a functional block diagram of a processing system connected to a computer according to the prior art.
Figure 2:
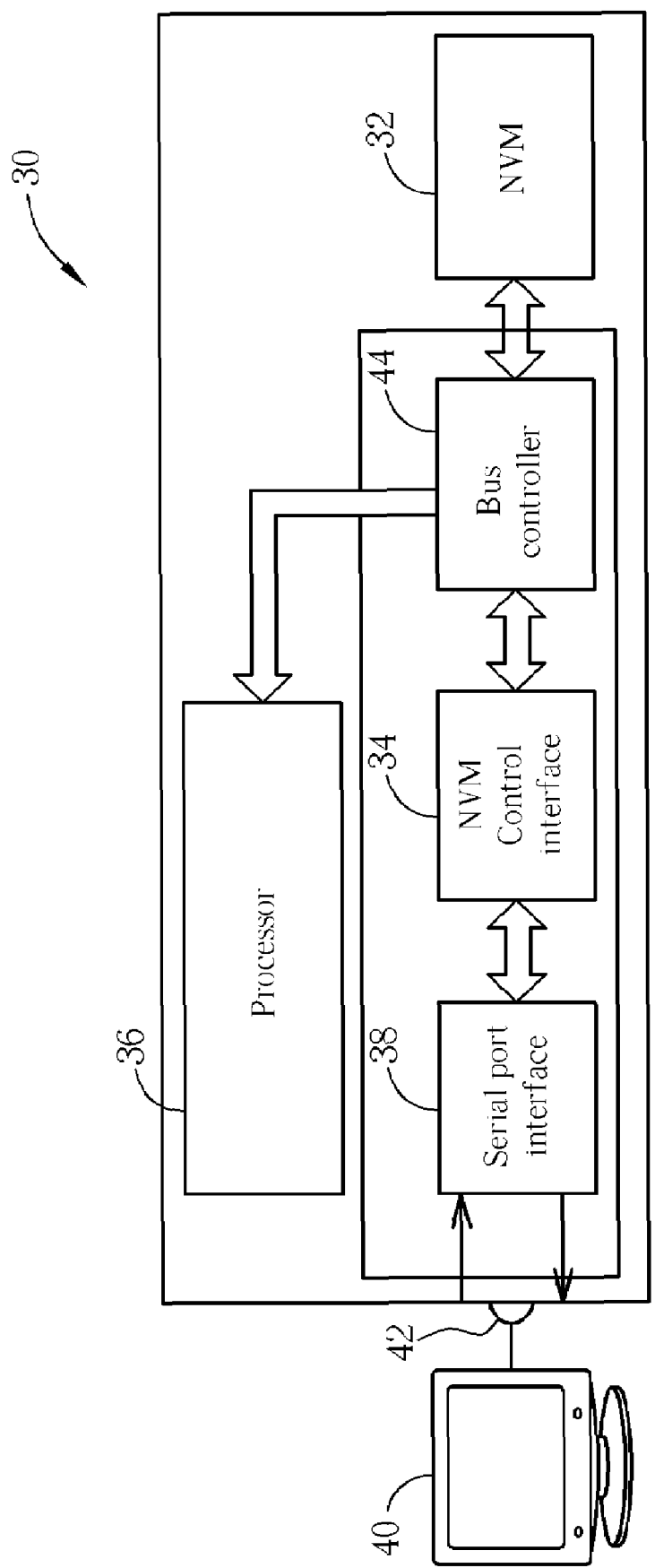
FIG. 2 is a functional block diagram of a processing system connected to a computer according to the present invention.

Please refer to FIG. 2 that is a functional block diagram of a processing system 30 connected to a computer 40 according to the present invention. Many of the characteristics of components of the processing system 30 are similar to the processing system 10, such as a NVM 32, a NVM control interface 34, a processor 36, and a serial port interface 38, so the descriptions of the functions of these components can be found in the description of the related art and will be not repeated.

However, the major differences between the two processing systems 10 and 30 are that the processing system 10 utilizes the processor 16 to connect the NVM control interface 14 with the serial port interface 18 and to process the update data, while the serial port interface 38 of the processing system 30 is directly electrically connected to the NVM control interface 34. Additionally, the NVM control interface 34 is capable of using the data bytes that are generated by converting the serial bits received from the computer 40 to update the firmware stored in the NVM 32.

Figure 9:
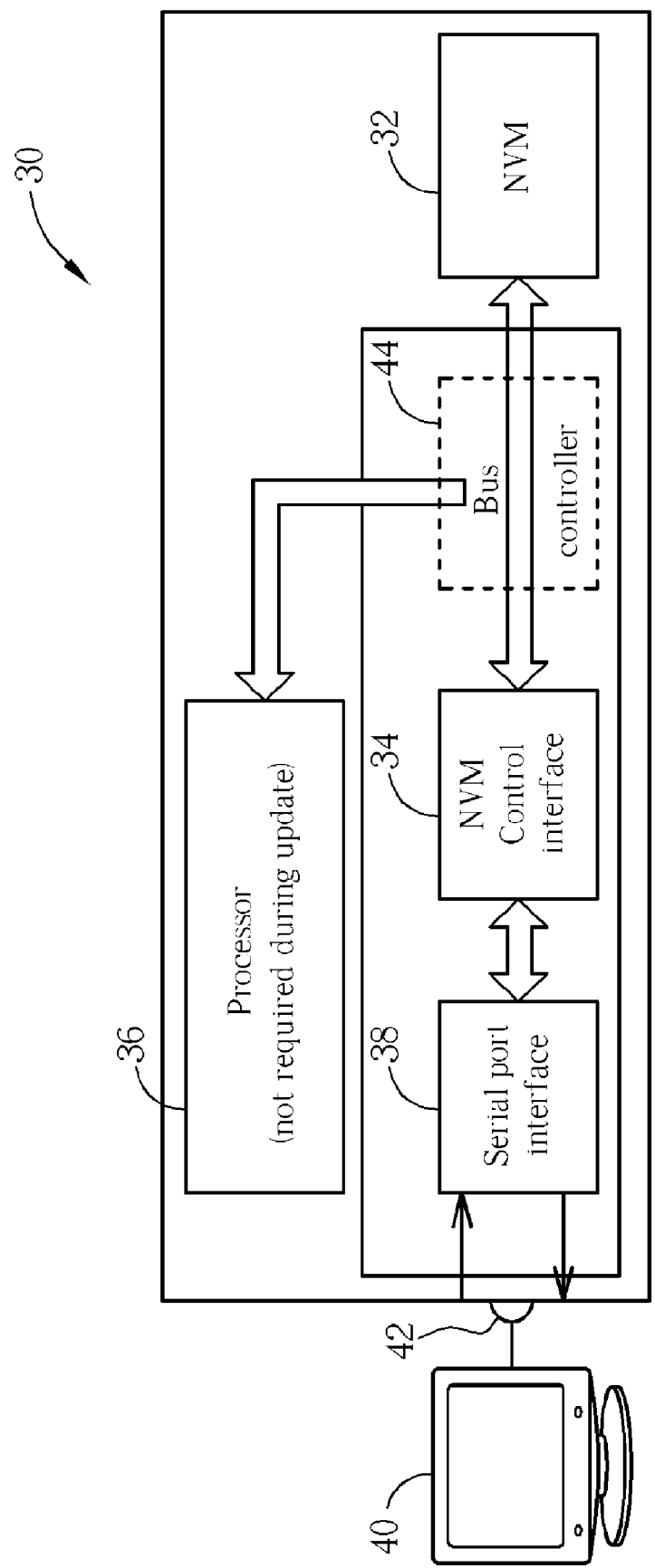
FIG. 9 is a functional block diagram of the processing system of FIG. 2 having the electrical connection between the processor and the NVM being abolished by the NVM controller while the firmware of the NVM is being updated.

The processing system 30 further comprises a bus controller 44 electrically connected to the processor 36, the NVM 32, and the NVM control interface 34 for controlling data transmission between the processor 36, the NVM 32, and the NVM control interface 34. Generally, the bus controller 44 is used to establish the electric connection between the processor 36 and the NVM 32 so that the processor 36 can operate regularly with the help of the firmware stored in the NVM 32. However, as is illustrated in FIG. 9, when the processing system 30 uses the data received from the computer 40 to update the firmware stored in the NVM 32, the bus controller 44 abolishes the electric connection between the processor 36 and the NVM 32 and establishes the electric connection between the NVM control interface 34 and the NVM 32.

Figure 3:
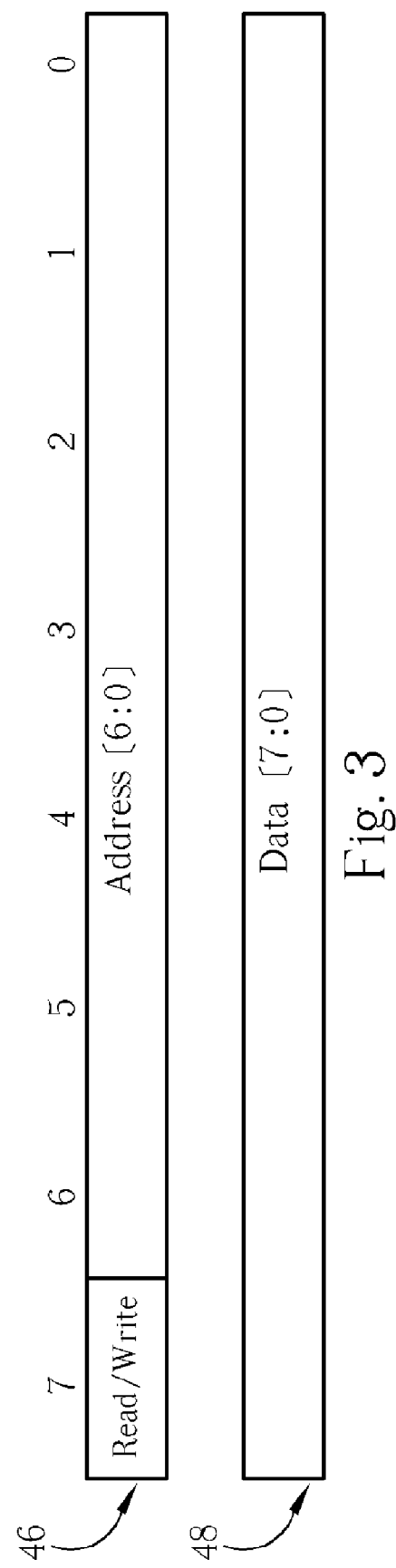
FIG. 3 shows the data structure of the data bytes according to the present invention.

Please refer to FIG. 3 that shows the data structure of the data bytes according to the present invention. As mentioned previously, the data bytes are used to update the firmware stored in the NVM 32 and are generated by converting the serial bits received from the computer 40. The data bytes comprise a command byte 46 and an information byte 48. The bit 7 of the command byte 46 is used to define an operational mode of the NVM control interface 34, i.e. a read mode or a write mode, and the other 7 bits 0-6 of the command byte 46 are used to record a memory address. The information byte 48 comprises the update data that is used to update the data stored in a corresponding address of the NVM 32, which corresponds to the address recorded in the bits 0-6 of the command byte 46.

Figure 4:
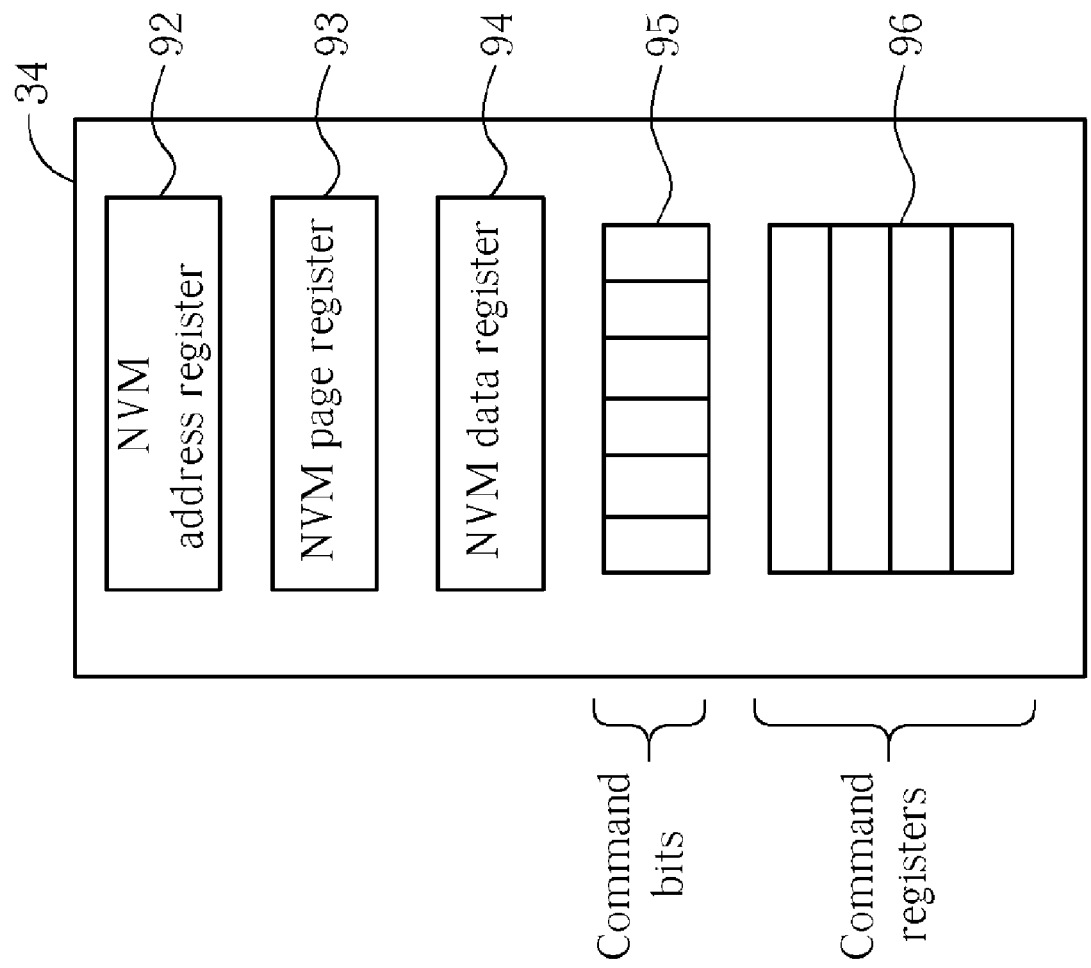
FIG. 4 is a functional block diagram of the NVM control interface in FIG. 2.

Please refer to FIG. 4 that is a functional block diagram of the NVM control interface 34. The NVM control interface 34 comprises an NVM address register 92 for specifying addresses of the NVM 92, an NVM page register 93 for specifying a download capacity of the NVM 32, an NVM data register 94 for storing a data byte stored in the address set by the NVM address register 92, a plurality of control bits 95 for specifying an operational mode of the NVM 32, and a plurality of command registers 96 for specifying commands to control operations of the NVM 32. Additionally, after each write/read (W/R) operation of the NVM 32 is finished, the address stored in NVM address register 92 is incremented. In the embodiment, a serial port 42 of the serial port interface 38 for connecting to the computer 40 is an RS-232 (Recommended Standard-232) port. For the purposes of this description, the processing system 30 will be used to identify a device as described above, but this should not construe the present invention as limited.

Figure 5:
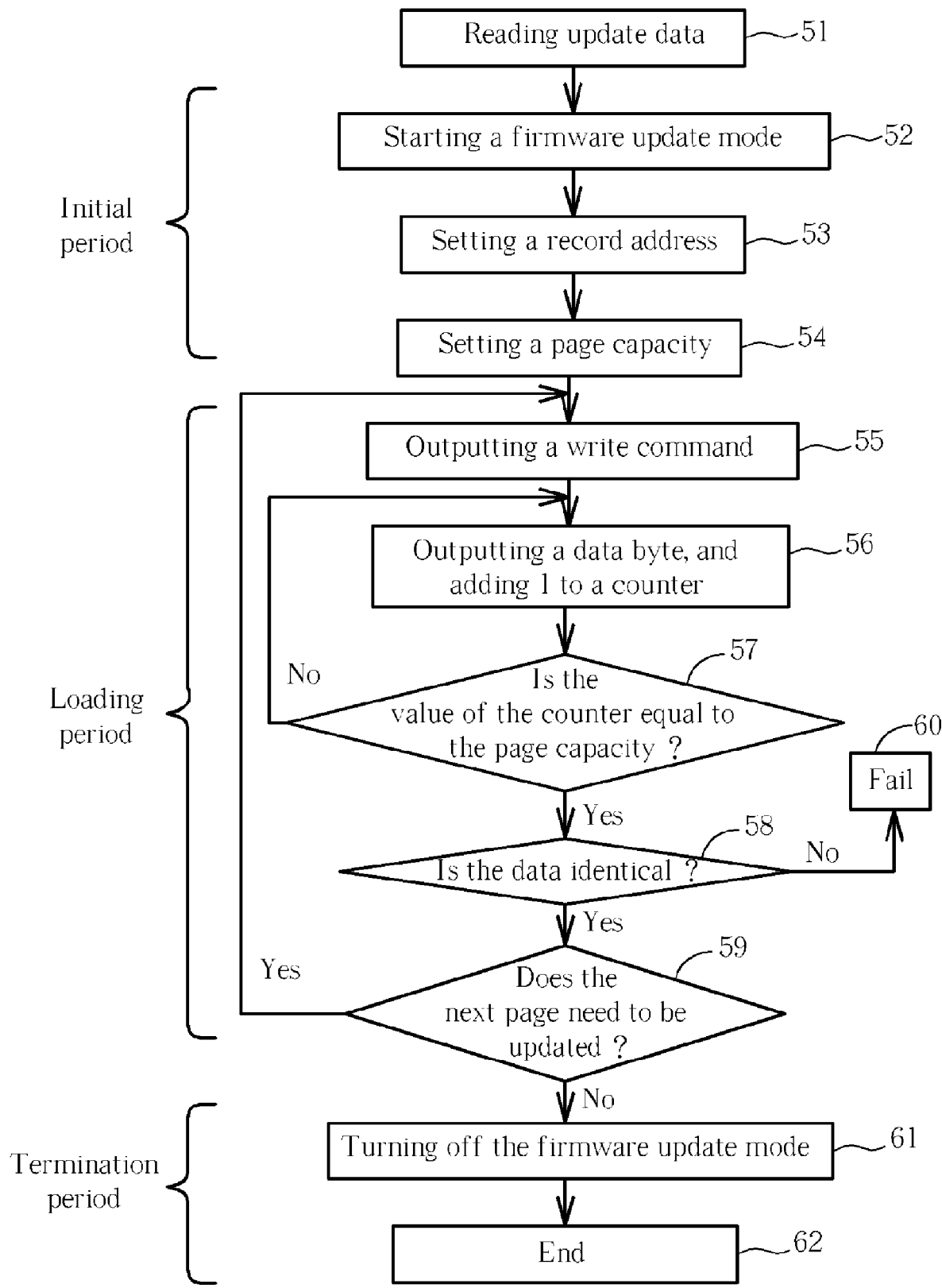
FIG. 5 is a flow chart of operations of the computer in FIG. 2 when updating the NVM using a non-handshake mode method.

In the following descriptions are about the control flows of the computer 40 and the NVM control interface 34. There are two modes of their operations, one is handshake mode and the other is non-handshake mode. The difference between these two modes is the waiting of last write commands. This is because the writing time of NVM is very long. If the writing time is longer than the transmitting time, it is necessary to wait the last write command to be finished. Please refer to FIG. 5 that is a flow chart of operations of the computer 40 in FIG. 2 when updating the NVM 32 using a non-handshake mode method. The operations of the computer 40 for updating the NVM 32 are divided into an initial period, a loading period, and a termination period, and respectively comprises following steps:

Initial Period:

Step 51: reading the data for updating the firmware stored in the NVM 32;

Step 52: starting a firmware update mode;

Step 53: setting a record address;

Step 54: setting a page capacity;

Loading Period:

Step 55: outputting a write command for writing data into the NVM 32 via the serial port 42;

Step 56: outputting a data byte read in step 51 via the serial port 42, and adding 1 to a counter;

Step 57: checking whether the value of the counter is equal to the page capacity. If the value of the counter is equal to the page capacity, then go to step 58. Otherwise, go to step 56;

Step 58: comparing the piece of data of the NVM 32 received from the NVM control interface 34 with the piece of data read in step 51 to determine whether the two pieces of data are identical. If the two pieces of data are identical, then go to step 59. Otherwise, go to step 60;

Step 59: determining whether the next page needs to be updated. If the next page needs to be updated, then go to step 55. Otherwise, go to step 61;

Step 60: turning into a fail-transmission mode;

Termination Period:

Step 61: turning off the firmware update mode; and

Step 62: finishing the update of the firmware stored in the NVM 32.

During the initial period, the statuses of the registers, such as the NVM address register 92 and the NVM page register 93, of the NVM control interface 34 are reset. During the loading period, the write command and the update data are transmitted to the NVM control interface 34. Meanwhile, the NVM control interface 34 reads a previous piece of data that is stored in the NVM 32 prior to the current piece of data and transmits the previous piece of data to the computer 40 for comparison. Then the NVM control interface 34 updates the current piece of data in the NVM 32 and the address stored in NVM address register 92 is increased. Moreover, the previous piece of data may not be read and transmitted from the NVM 32 to the computer 40 for comparison until the update data for updating an entire page of the NVM 32 has been transmitted to the NVM control interface 34 so that switches in the data transmission direction between the processing system 30 and the computer 40 can be reduced. Finally, the update of the NVM 32 ends within the termination period.

Figure 6:
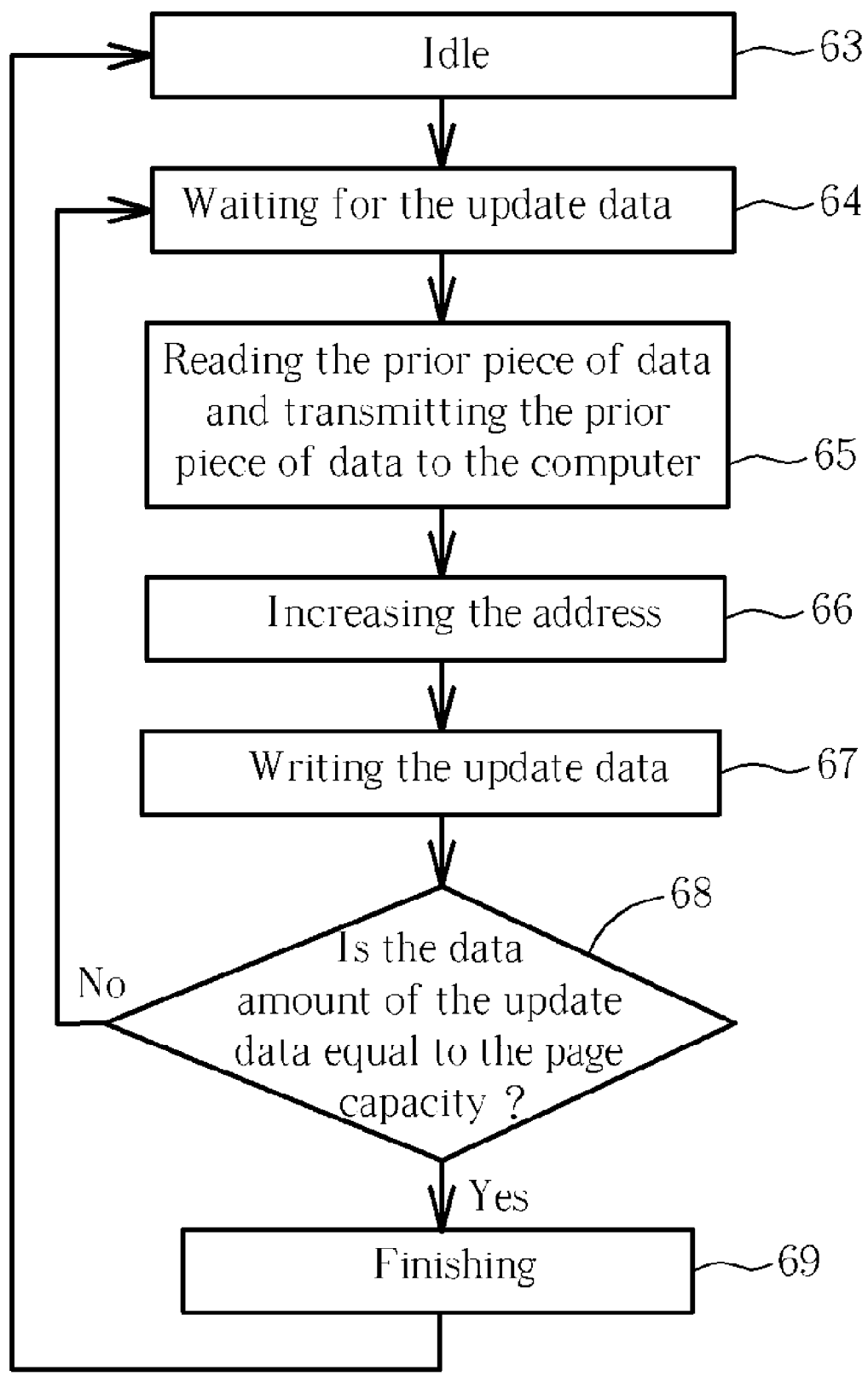
FIG. 6 is a flow chart of operations of the NVM control interface in FIG. 2 when using the non-handshake mode method.

Please refer to FIG. 6 that is a flow chart of operations of the NVM control interface 34 in FIG. 2 when using the non-handshake mode method. The operations include:

Step 63: being in an idle mode and waiting for the write command from the computer 40;

Step 64: waiting for the update data from the computer 40 after receiving the write command;

Step 65: receiving the update data from the computer 40 and reading a previous piece of data that is stored in the NVM 32 prior to the current piece of data and transmitting the previous piece of data to the computer 40 for comparison;

Step 66: increasing the address stored in the NVM address register 92;

Step 67: writing the update data into the corresponding address in the NVM 32;

Step 68: determining whether the data amount of update data is equal to the page capacity set by the NVM page register 93. If the data amount of the update data is equal to the page capacity, then go to step 69. Otherwise, go to step 64; and Step 69: finishing the update of the NVM 32 and turning back to the idle mode.

After the NVM control interface 34 receives the write command, the NVM control interface 34 waits for the update data from the computer 40. When NVM control interface 34 receives the update data, NVM control interface 34 first reads the previous piece of data from the NVM 32 and transmits the previous piece of data to the computer 40 for comparison, and then the NVM control interface 34 writes the update data into the NVM 32 and the address stored in the NVM address register 92 is increased automatically. Finally, the processing system 30 finishes updating the firmware stored in the NVM 32.

Figure 7:
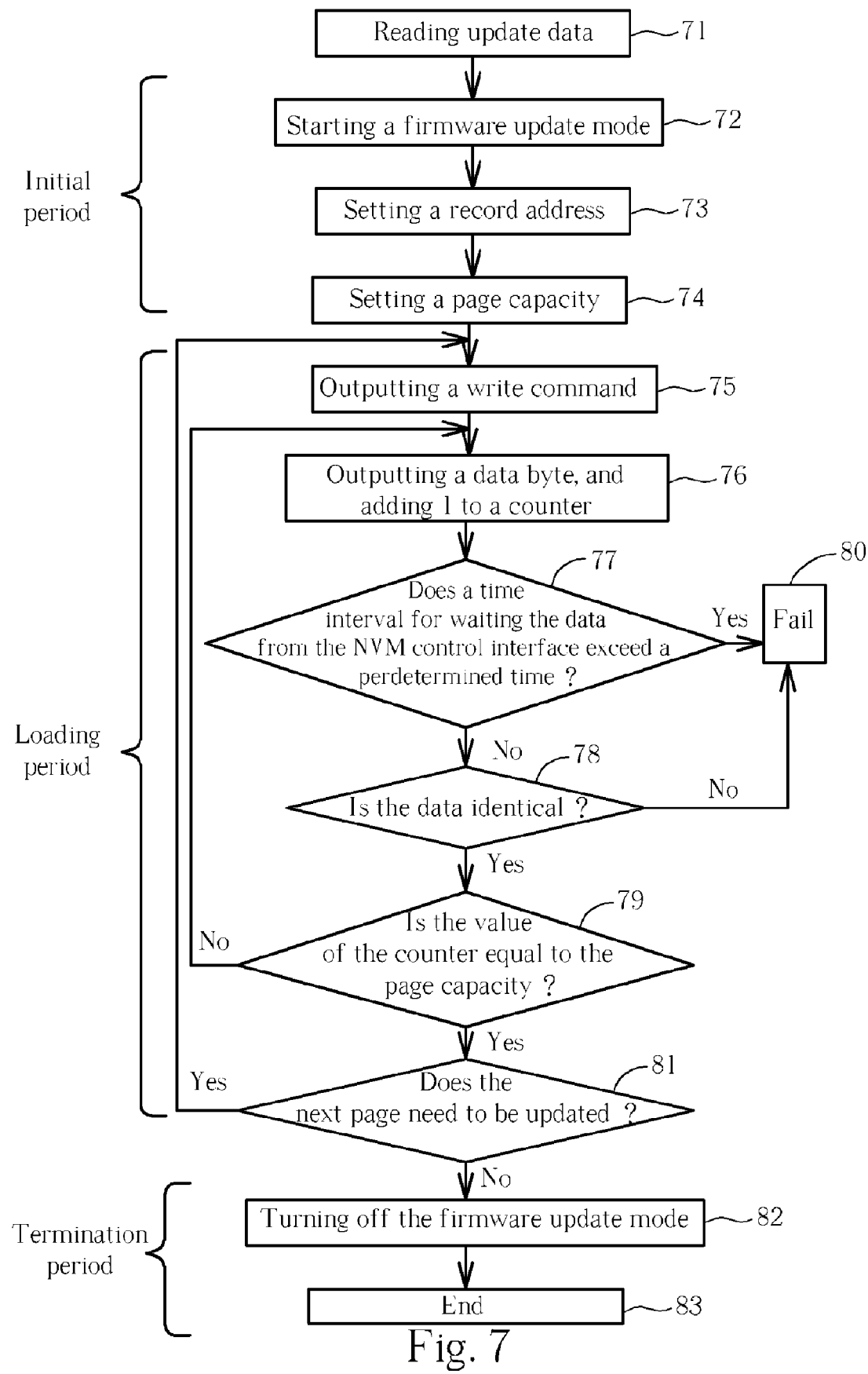
FIG. 7 is a flow chart of operations of the computer in FIG. 2 when updating the NVM using a handshake mode method.

Please refer to FIG. 7 that is a flow chart of operations of the computer 40 in FIG. 2 when updating the NVM 32 using a handshake mode method. The operations of the computer 40 for updating the NVM 32 are divided into an initial period, a loading period, and a termination period, and respectively comprises following steps:

Initial Period:

Step 71: reading the data for updating the firmware stored in the NVM 32;

Step 72: starting a firmware update mode;

Step 73: setting a record address;

Step 74: setting a page capacity;

Loading Period:

Step 75: outputting a write command for writing data into the NVM 32 via the serial port 42;

Step 76: outputting a data byte read in step 71 via the serial port 42, and adding 1 to a counter;

Step 77: waiting for data from the NVM control interface 34, and determining whether a time interval for waiting the data from the NVM control interface 34 exceeds a predetermined time interval. If the time interval exceeds the predetermined time interval, then go to step 80. Otherwise, go to step 78;

Step 78: comparing the piece of data of the NVM 32 received from the NVM control interface 34 with the piece of data read in step 71 to determine whether the two pieces of data are identical. If the two pieces of data are identical, then go to step 79. Otherwise, go to step 80;

Step 79: determining whether the value stored in the counter is equal to the page capacity. If the value stored in the counter is equal to the page capacity, then go to step 81. Otherwise, go to step 76;

Step 80: turning into a fail-transmission mode;

Step 81: determining whether the next page needs to be updated. If the next page needs to be updated, then go to step 75. Otherwise, go to step 82;

Termination Period:

Step 82: turning off the firmware update mode; and

Step 83: finishing the update of the firmware stored in the NVM 32.

During the initial period, the statuses of the registers, such as the NVM address register 92 and the NVM page register 93, of the NVM control interface 34 are reset. During the loading period, the write command and the data for the update of the NVM 32 are transmitted to the NVM control interface 34. Meanwhile the NVM control interface 34 reads a previous piece of data that is stored in the NVM 32 prior to the current piece of data and transmits the previous piece of data to the computer 40 for comparison. If the previous piece of data received from the NVM control interface 34 is not identical with the corresponding data recorded by the computer 40, the action for updating the firmware stored in the NVM 32 is terminated. Finally, the update of the NVM 32 ends within the termination period.

Figure 8:
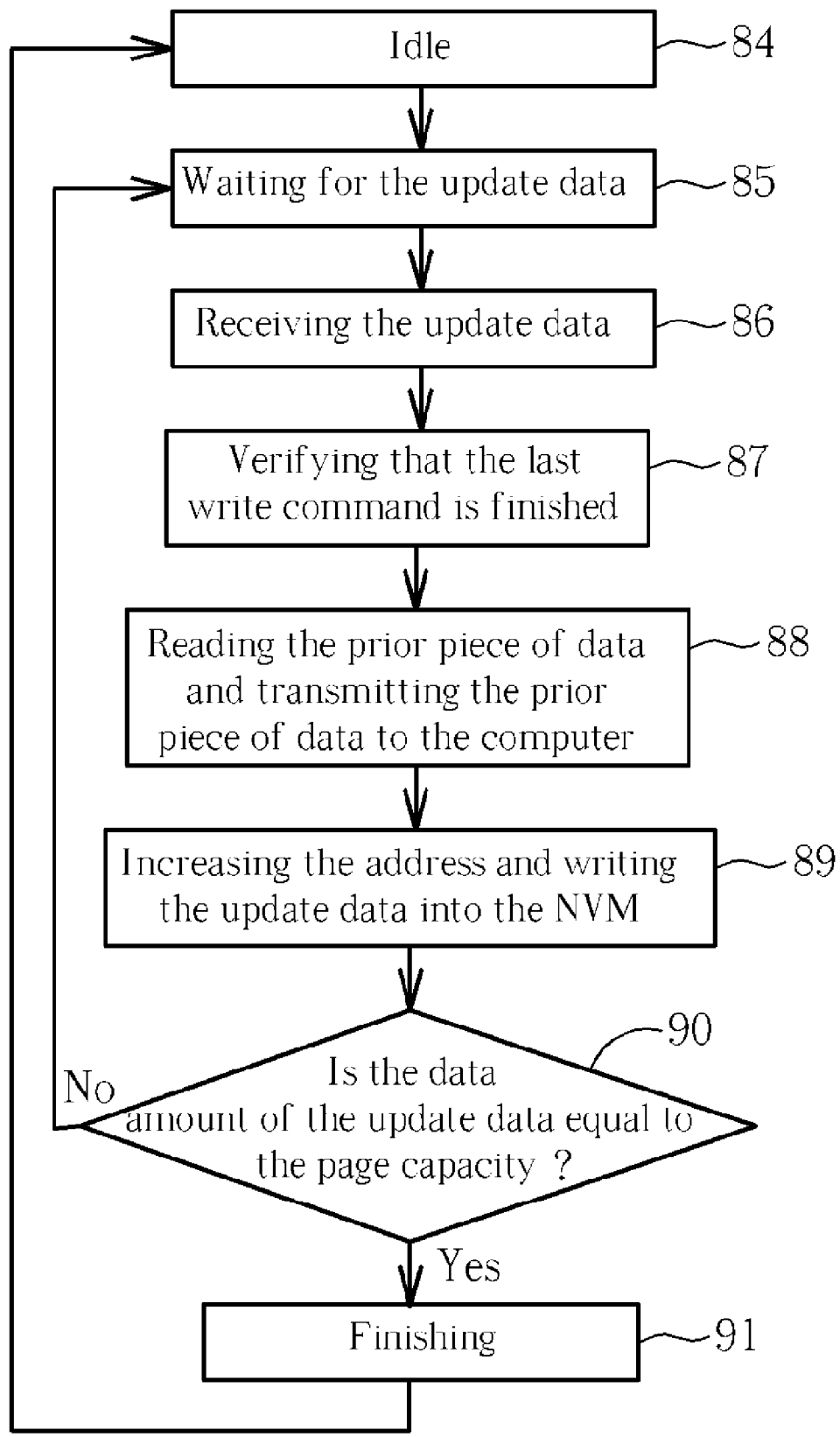
FIG. 8 is a flow chart of operations of the NVM control interface in FIG. 2 when using the handshake mode method.

Please refer to FIG. 8, which is a flow chart of operations of the NVM control interface 34 in FIG. 2 when using the handshake mode method. The operations include:

Step 84: being in an idle mode and waiting for the write command from the computer 40;

Step 85: waiting for the update data from the computer 40 after receiving the write command;

Step 86: receiving the update data from the computer 40;

Step 87: determining whether the last write action command has been finished;

Step 88: reading the previous piece of data stored in the current address in the NVM 32, and transmitting the previous piece of data to the computer 40;

Step 89: increasing the address stored in the NVM address register 92 and writing the update data into the corresponding address in the NVM 32;

Step 90: determining whether the data amount of the update data is equal to the page capacity set by the NVM page register 93. If the data amount of update data is equal to the page capacity, then go to step 91. Otherwise, go to step 85; and Step 91: finishing the update of the NVM 32 and turning back to the idle mode.

After the NVM control interface 34 receives the write command, the NVM control interface 34 waits for the update data from the computer 40. When the NVM control interface 34 receives the update data, the NVM control interface 34 first verifies that the last write command is finished. When the last write command is finished, the NVM control interface 34 reads the current piece of data from the NVM 32 and transmits the current piece of data to the computer 40 for comparison, and then the address stored in the NVM address register 92 is increased automatically and the NVM control interface 34 writes the update data into the NVM 32. Finally, the processing system 30 finishes updating the firmware stored in the NVM 32.

In contrast to the related art, the claimed invention provides a processing system capable of directly updating firmware stored in a non-volatile memory (NVM) by establishing a protocol with a serial port without utilizing a processor or isolating a part of the NVM for storing system program codes. The update data is verified byte by byte, so the accuracy of the update data can be guaranteed. Moreover, the total number of pins of the processing system for connecting a computer is reduced to 2, so the processing system can be easily used in many fields.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing system coupled to an apparatus, the processing system comprising:
a non-volatile memory (NVM) storing firmware needed by the processing system; and
an NVM control interface writing and reading data stored in the NVM; wherein the apparatus verifies a previous piece of data being already written into the NVM, and after receiving a current piece of data and before receiving another piece of data that is to be written into the NVM and immediately follows the current piece of data, the NVM control interface transmits the previous piece of data read from the NVM to the apparatus for verification, and writes the current piece of data into the NVM.

2. The processing system of claim 1, further comprising a processor and a bus controller electrically connected to the processor, wherein during update of the firmware stored in the NVM, the bus controller prevents data access between the processor and the NVM.

3. The processing system of claim 1, further comprising a serial port interface electrically connected between the apparatus and the NVM control interface for receiving and transmitting data to the apparatus, wherein the NVM control interface converts serial data bits received from the serial port interface into data bytes and converts data bytes received from the NVM into serial data bits.

4. The processing system of claim 1, wherein before the NVM control interface verifies the previous piece of data, the NVM control interface checks whether or not the previous piece of data has been written into the NVM.

5. The processing system of claim 1, wherein the NVM control interface comprises:
an NVM address register for specifying addresses of the NVM, wherein an address stored in NVM address register is incremented after a write/read (W/R) operation of the NVM is finished;
an NVM page register for specifying a download capacity of the NVM;
an NVM data register for storing a data byte stored in the address specified by the NVM address register;
a plurality of control bits for setting an operational mode of the NVM; and
a plurality of command registers for specifying commands so as to control operations of the NVM.

6. The processing system of claim 1, wherein the apparatus verifies the previous piece of data to determine whether the previous piece of data is identical to original data that was previously transmitted from the apparatus to the processing system.

7. A processing system electrically connected to an apparatus, the processing system comprising:
a processor;
a non-volatile memory (NVM) storing firmware required for the processor for operation of the processing system;
a serial port interface receiving and transmitting data to the apparatus; and
an NVM control interface coupled between the serial port interface and the NVM, writing and reading data in the NVM;
wherein the NVM control interface reads a previous piece of data in data bytes format from the NVM, converts the data bytes into serial data bits for the apparatus to verify the previous piece of data, and writes a current piece of data into the NVM.

8. The processing system of claim 7, wherein when the NVM control interface writes the current piece of data into the NVM, the NVM control interface receives the serial data bits from serial port interface, converts the serial data bits into data bytes, and writes the data bytes into the NVM.

9. The processing system of claim 8, further comprising a processor and a bus controller electrically connected to the processor, wherein the bus controller prevents data access between the processor and the NVM.

10. The processing system of claim 7, wherein before the NVM control interface reads the previous piece of data, the NVM control interface checks whether or not the previous piece of data has been written into the NVM.

11. The processing system of claim 7, wherein the NVM control interface comprises:
an NVM address register for specifying addresses of the NVM, wherein an address stored in NVM address register is incremented after a write/read (W/R) operation of the NVM is finished;
an NVM page register for specifying a download capacity of the NVM;
an NVM data register for storing a data byte stored in the address specified by the NVM address register;
a plurality of control bits for setting an operational mode of the NVM; and
a plurality of command registers for specifying commands so as to control operations of the NVM.

12. A method for a first apparatus having a non-volatile memory (NVM) to receive firmware from a second apparatus, the method comprising:
sending data corresponding to the firmware from the second apparatus to the NVM;
verifying a previous piece of data being already written into the NVM; and
after receiving a current piece of data and before receiving another piece of data that is to be written into the NVM and immediately follows the current piece of data, reading the previous piece of data from the NVM for verification, and writing the current piece of data into the NVM.

13. The method of claim 12, further comprising:
preventing a processor located in the first apparatus to access any data in the NVM during update of the firmware stored in the NVM.

14. The method of claim 12, further comprising converting serial data bits received from the second apparatus into data bytes and converting data bytes received into serial data bits.

15. The method of claim 12, further comprising:
checking whether or not the previous piece of data has been written into the NVM before verifying the previous piece of data.

16. The method of claim 12, further comprising:
specifying addresses of the NVM, wherein an address stored in an NVM address register is incremented after a write/read (W/R) operation of the NVM is finished;
specifying a download capacity of the NVM;
storing a data byte stored in the address specified by the NVM address register;
specifying an operation mode of the NVM; and specifying commands so as to control operations of the NVM.

17. The method of claim 12, wherein the verification further comprises determining whether the previous piece of data is identical to original data that was previously transmitted from the second apparatus to the first apparatus.

* * * * *